United States Patent [19]

Kobayashi et al.

[11] Patent Number: 4,888,491
[45] Date of Patent: Dec. 19, 1989

[54] DEVICE FOR MEASURING ANGULAR DEVIATION OF FLAT PLATE

[75] Inventors: Masaki Kobayashi; Minemasa Ohta, both of Yamanashi, Japan

[73] Assignees: Pioneer Electronic Corporation, Tokyo; Pioneer Video Corporation, Yamanashi, both of Japan

[21] Appl. No.: 200,105

[22] Filed: May 26, 1988

[30] Foreign Application Priority Data

Jul. 28, 1987 [JP] Japan ................... 62-188635

[51] Int. Cl.⁴ ............................................ G01N 21/86
[52] U.S. Cl. ..................................... 250/561; 250/230
[58] Field of Search ............... 250/230, 561, 231 SE, 250/235; 356/371; 369/44–46

[56] References Cited

U.S. PATENT DOCUMENTS 3,667,846  6/1972  Nater et al. ..................... 356/371
4,453,083  6/1984  Bohlander et al. ............... 250/561
4,589,773  5/1986  Ido et al. ......................... 356/371
4,673,817  6/1987  Oomen ............................ 250/561

Primary Examiner—David C. Nelms
Attorney, Agent, or Firm—Sughrue, Mion, Zinn, Macpeak & Seas

[57] ABSTRACT

Herein disclosed is a device for accurately measuring an angular deviation of a flat plate such as a video disk and a digital audio disk. A light beam emitted from a light source is obliquely made incident on the flat plate. A light beam reflected by the flat plate is refracted by a convex lens and detected by a semiconductor position-sensitive detector. The convex lens and the position-sensitive detector are disposed in such a manner that the distance between a reflection point on the flat plate and the convex lens and the distance between the convex lens and the position-sensitive detector become two times the focal length and the focal length of the convex lens, respectively.

12 Claims, 1 Drawing Sheet

DEVICE FOR MEASURING ANGULAR DEVIATION OF FLAT PLATE

BACKGROUND OF THE INVENTION

The present invention relates to a device for measuring the angular deviation of a flat plate, and particularly relates to a device for measuring the angular deviation of a flat plate such as a video disk and a digital audio disk from a reference position.

FIG. 2 shows a conventional device for measuring the angular deviation of a flat disk. A light source 2 for emitting a light beam upon the disk and a position detector 3 which receives the light beam reflected by the disk are provided in the device. The light beam from the light source 2 is perpendicularly made incident upon the disk 1 in a reference position shown by a full line in FIG. 2. The light beam reflected by the disk 1 in the reference position returns to the light source 2. When the disk is inclined out of the reference position, the reflected light beam from the disk reaches the position detector 3.

If the disk is inclined by an angle θ out of the reference position, as shown by a one-dot chain line 1' in FIG. 2, the incidence position of the reflected light beam on the position detector 3 changes depending on the angle θ. The distance d between the incidence position of the reflected light beam on the position detector 3 and an optical axis of the light beam from the light source 2 is expressed as a function of a distance l between the disk 1 and a light-receiving surface of the position detector 3 and the angle θ as follows:

$$d = l \cdot \tan 2\theta.$$

It is obviously understood from the above equation that the angle θ can be determined if the distance l is fixed and the distance d is measured.

However, when the disk is not only inclined but also displaced along the optical axis of the emitted light beam as shown by a two-dot chain line 1'' in FIG. 2, the distance l is changed so that the angle θ of the disk 1 cannot be accurately determined in accordance with the above equation. This is a drawback.

SUMMARY OF THE INVENTION

The present invention has been made in order to eliminate the above-mentioned drawback.

Accordingly, it is an object of the present invention to provide a device capable of accurately measuring an angular deviation of a flat plate even if the distance between the flat plate and a light-receiving surface of a position detector is changed.

The device comprises a light source for emitting a light beam so as to be made obliquely incident on the flat plate, a convex lens located on the optical axis of a light beam reflected by the flat plate in a reference position, and a position detector located on the focal plane of the convex lens to generate an output signal corresponding to the incidence position of the reflected light beam in the light-receiving surface of the position detector. The angular deviation of the flat plate is calculated on the basis of the output signal from the position detector.

As a result, the angular deviation of the flat plate can be accurately measured even if the flat plate is shifted.

DETAILED DESCRIPTION OF THE PREFERRED EMBODIMENT

An embodiment of the present invention will be hereinafter described in detail with reference to the accompanying drawings.

Figure 1:
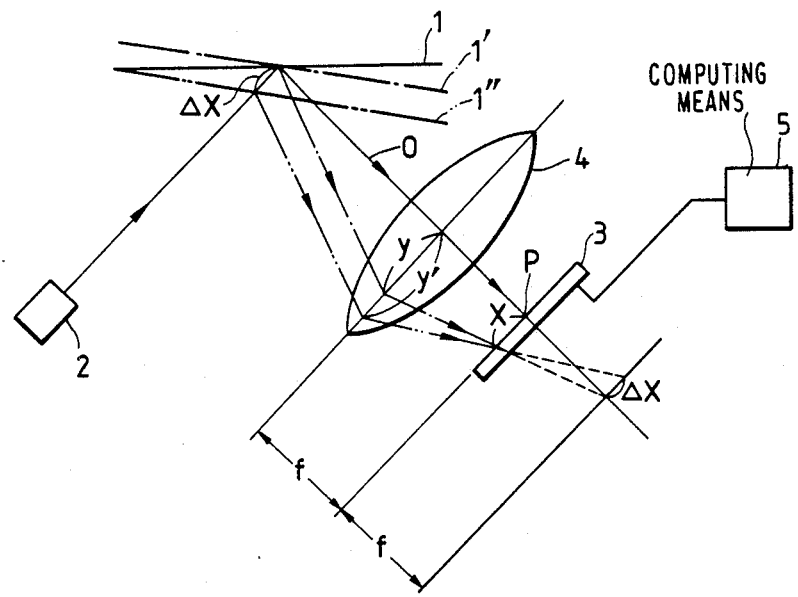
FIG. 1 shows a schematic view of an angular deviation measuring device which is an embodiment of the present invention.
Figure 2:
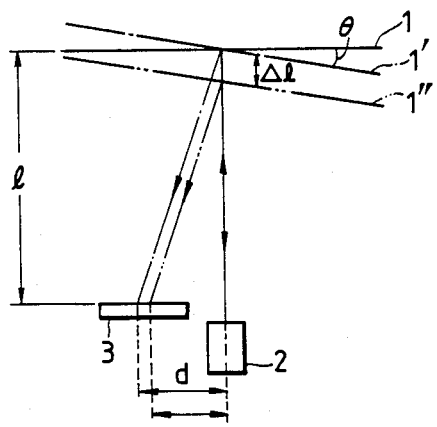
FIG. 2 shows a schematic view of a conventional angular deviation measuring device.

FIG. 1 shows an angular deviation measuring device according to an embodiment of the invention. The mutually corresponding portions shown in FIGS. 1 and 2 are denoted by the same reference numerals therein. As shown in FIG. 1, a disk 1 in a reference position shown by a full line therein is obliquely irradiated with a prescribed incidence angle, for example 45°, with a light beam from a light source 2 such as a semiconductor laser or a light-emitting diode. A convex lens 4 is located across and perpendicularly to the reference optical axis 0 of a light beam reflected by the disk 1 in the reference position. The distance between the light beam reflection point on the disk 1 and the convex lens 4 is set twice as long as the focal length of the convex lens 4. The reflected light beam transmitted through the convex lens 4 reaches the light-receiving surface of a position detector 3 which is a photodetector. The light-receiving surface of the position detector 3 is located in the focal plane of the convex lens 4.

The position detector 3 generates an output signal corresponding to the incidence position of the reflected light beam on the light-receiving surface of the position detector. The position detector 3 is for example a semiconductor position-sensitive detector for detecting a position of light spot, to which a silicon photodiode is applied. The angular deviation is calculated by a computing device 5 on the basis of the output signal of the position detector 3.

Figure 3:
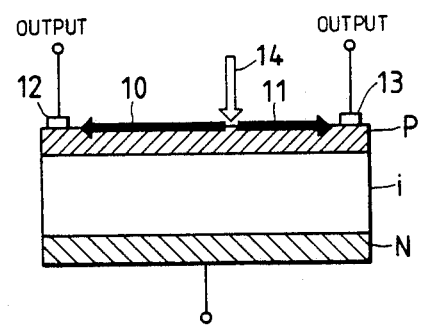
FIG. 3 shows a sectional view of a semiconductor position-sensitive detector as a position detector.

FIG. 3 shows a sectional view of the semiconductor position-sensitive detector made of a flat silicon plate and comprising a p-type layer at the obverse side of the plate, an n-type layer at the reverse side thereof, and an i-type layer therebetween. The light beam 14 made incident on the semiconductor position-sensitive detector is subjected to photoelectric conversion, and resultant photocurrents 10 and 11 are divided and outputted from electrodes 12 and 13 attached to the p-type layer. When the light beam 14 has reached the position-sensitive detector, electric charge an proportional to the magnitude of the energy of the light beam is generated in the incidence position of the light beam, and flows as the photocurrents 10 and 11 in the p-type layer (which is a resistive layer), and is outputted from the two electrodes 12 and 13. Since the whole p-type layer is made uniform in resistivity, the photocurrents 10 and 11 are divided inversely in proportion to the distances (resistances) from the incidence position of the light beam 14 to the respective electrodes 12 and 13.

With the foregoing constitution, when the disk 1 is in the reference position as shown by the full line in FIG. 1, namely, the disk 1 has no angular deviation, the light beam reflected by the disk surface is made to be the reference optical axis 0 for the convex lens 4 and the position detector 3. The optical axis 0 intersects the light-receiving surface of the position detector 3 at the point P.

When the disk is inclined by an angular deviation $\theta$ as shown by a one-dot chain line 1' in FIG. 1, the reflected light beam proceeds in an optical path departed from the reference optical axis 0 as shown by another one-dot chain line. The reflected light beam is refracted by the convex lens 4 and reaches the light-receiving surface of the position detector 3 at the incidence position which is distant from the point P by x. The distance x is expressed as:

$$x = f \cdot \tan 2\theta$$

where, f denotes the focal length of the convex lens 4. Therefore, the angular deviation $\theta$ can be determined by measuring the distance x, as follows:

$$\theta = (\tfrac{1}{2}) \tan^{-1}(x/f).$$

The determination of the angular deviation $\theta$ in accordance with the above equation is performed by a computing device 5 such as a microcomputer on the basis of the output signal from the position detector 3.

When the disk is inclined by the angular deviation $\theta$ and also displaced vertically as shown by a two-dot chain line 1'' therein, the reflected light beam proceeds in an optical path as shown by another two-dot chain line and is then refracted by the convex lens 4 so that the reflected light beam reaches the same incidence position on the light-receiving surface of the position detector 3 as that when the disk is only inclined to the angular deviation. Since the distance between the convex lens 4 and the light beam reflection point on the disk 1 in the reference position is twice as long as the focal length f of the convex lens 4, the reflection point on the disk 1 is imaged in a symmetric position, the distance between which and the convex lens 4 is twice as long as the focal length thereof.

The distance y between the center of the convex lens 4 and the intersection between the reflected light beam shown by the one-dot chain line and the center plane of the convex lens 4 is expressed as:

$$y = 2f \cdot \tan 2\theta.$$

The distance $\Delta x$ between the reflection point on the disk 1 in the reference position shown by the full line and that on the disk 1'' in the position shown by the two-dot chain line, and the distance y' between the intersection between the reflected light beam shown by the two-dot chain line and the center plane of the convex lens 4, have a relationship as follows:

$$y' = y + \Delta x.$$

The distance x' in the light-receiving surface of the position detector 3 between the point P and the incident position of the reflected light beam shown by the two-dot chain line is expressed as:

$$\begin{aligned} x' &= \{(y' + \Delta x)/2\} - \Delta x \\ &= \{(y + \Delta x + \Delta x)/2\} - \Delta x \\ &= y/2. \end{aligned}$$

Therefore, $x = x'$.

Although the disk 1 in the reference position is obliquely irradiated by the light beam with the incidence angle of 45° in the above-described embodiment, the present invention is not confined thereto but the disk 1 in the reference position may be obliquely irradiated by the light beam with any other appropriate incidence angle.

Although the foregoing embodiment is described one-dimensionally, a two-dimensional angular deviation can be measured with the present invention In this case, a two-dimensional semiconductor position-sensitive detector may be used as the position detector 3.

What is claimed is:

1. A device for measuring an angular deviation of a flat plate from a reference position thereof, comprising:
    a light source for emitting a light beam which is obliquely made incident on said flat plate;
    a convex lens located across an optical axis of a light beam reflected from said flat plate in said reference position, for refracting said reflected light beam;
    a position detector whose light-receiving surface is located in a focal plane of said convex lens, for generating a output electric signal corresponding to an incidence position of said reflected light beam on said light-receiving surface of said position detector; and
    computing means for calculating said angular deviation of said flat plate on the basis of said output electric signal provided from said position detector.

2. A device for measuring an angular deviation of a flat plate as claimed in claim 1, wherein a distance between a light reflection point on said flat plate and a center plane of said convex lens is substantially twice a focal length of said convex lens.

3. A device for measuring an angular deviation of a flat plate as claimed in claim 1, wherein said position detector is a semiconductor position-sensitive detector.

4. A device for measuring an angular deviation of a flat plate as claimed in claim 2, wherein said light beam is obliquely made incident on said flat plate at an angle of substantially 45° with respect to said flat plate being in said reference position.

5. A device for measuring an angular deviation of a flat plate as claimed in claim 4, wherein said position detector is a semiconductor position-sensitive detector 6. A device for measuring an angular deviation of a flat plate as claimed in claim 5, wherein said position detector produces first and second current signals and outputs said current signals as said output electric signal, a proportionality of said first and second current signals with respect to each other corresponding to said incidence position of said reflected light beam on said light-receiving surface.

7. A device for measuring an angular deviation of a video or audio disk from a reference position thereof, comprising:
    a light source for emitting a light beam which is obliquely made incident on said disk;
    a convex lens located across an optical axis of a light beam reflected from said disk in said reference position, for refracting said reflected light beam;
    a position detector whose light-receiving surface is located in a focal plane of said convex lens, for generating an output electric signal corresponding to an incidence position of said reflected light beam on said light-receiving surface of said position detector; and computing means for calculating said angular deviation of said disk on the basis of said output electrical signal provided from said position thereof.

8. A device for measuring an angular deviation of a disk as claimed in claim 7, wherein a distance between a light reflection point on said disk and a center plane of said convex lens is substantially twice a focal length of said convex lens.

9. A device for measuring an angular deviation of a disk as claimed in claim 7, wherein said position detector is a semiconductor position-sensitive detector.

10. A device for measuring an angular deviation of a disk as claimed in claim 8, wherein said light beam is obliquely made incident on said disk at an angle of substantially 45° with respect to said disk being in said reference position.

11. A device for measuring an angular deviation of a disk as claimed in claim 10, wherein said position detector is a semiconductor position-sensitive detector.

12. A device for measuring an angular deviation of a disk as claimed in claim 11, wherein said position detector produces first and second current signals and outputs said current signals as said output electric signal, a proportionality of said first and second current signals with respect to each other corresponding to said incidence position of said reflected light beam on said light-receiving surface.

* * * * *